United States Patent
Shank et al.

(10) Patent No.: US 6,445,776 B1
(45) Date of Patent: Sep. 3, 2002

(54) ABSTRACT INTERFACE FOR MEDIA AND TELEPHONY SERVICES

(75) Inventors: Charles Kevin Shank, Austin, TX (US); R. Alberto Villarica, Fairport, NY (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/223,842

(22) Filed: Dec. 31, 1998

(51) Int. Cl.[7] .......................... H04M 1/64; H04M 3/42; H04M 3/00
(52) U.S. Cl. .................. 379/88.1; 379/67.1; 379/88.03; 379/88.07; 379/88.13; 379/88.16; 379/88.17; 379/201.01; 379/265.09; 379/908
(58) Field of Search ...................... 379/67.1, 70, 76, 379/84, 88.01, 88.04, 88.07, 88.13, 88.14, 88.17, 88.22, 88.28, 100.15, 88.1, 112, 154, 201, 207, 210, 219, 220, 229, 242, 243, 265.09, 207.11, 88.02, 88.16, 908, 201.01

(56) References Cited

U.S. PATENT DOCUMENTS

| | | | | |
|---|---|---|---|---|
| 5,657,383 A | * | 8/1997 | Gerber et al. ............... | 379/226 |
| 5,870,605 A | * | 2/1999 | Bracho et al. .............. | 395/682 |
| 5,923,879 A | * | 7/1999 | Sasmazel et al. ........... | 395/705 |
| 5,974,237 A | * | 10/1999 | Shurmer et al. ....... | 395/200.34 |
| 5,999,609 A | * | 12/1999 | Nishimura .................. | 379/201 |
| 6,141,686 A | * | 10/2000 | Jackowski et al. .......... | 709/224 |
| 6,167,253 A | * | 12/2000 | Farris et al. ................. | 455/412 |
| 6,292,827 B1 | * | 9/2001 | Raz ............................ | 709/217 |
| 6,351,453 B1 | * | 2/2002 | Nolting et al. .............. | 370/234 |

* cited by examiner

*Primary Examiner*—Allan Hoosain
(74) *Attorney, Agent, or Firm*—Withrow & Terranova, P.L.L.C.

(57) ABSTRACT

A server provides media and telephony services in a telecommunications network. The server has a distributed, object-oriented software architecture, allowing client applications to access resources located anywhere in the network. The server provides interfaces to media and telephony resources so that client applications, which may access the server through an IP data network, can access the resources. The software architecture framework is provided by Common Object Request Broker Architecture (CORBA). The interfaces provided by the server are Interface Definition Language (IDL) application program interfaces (APIs) implemented using a distributed object model such as CORBA.

30 Claims, 3 Drawing Sheets

ABSTRACT INTERFACE FOR MEDIA AND TELEPHONY SERVICES

CROSS-REFERENCE TO RELATED APPLICATIONS

This application is related to U.S. patent application Ser. No. 09/223,972 "Distributed Open Architecture for Media and Telephony Services," which is filed simultanseously with this application.

BACKGROUND OF THE INVENTION

The present invention relates generally to a system and method for providing media and telephony services in a telecommunications network and, more particularly, to an abstract interface for providing applications access to media and telephony services in a distributed computing environment.

The demand for advanced telephony applications in telecommunications networks has grown significantly during the past few years. The area of media and telephony applications, also referred to as computer telephony, includes a wide variety of application-specific devices, many of which have proprietary implementations. A diverse group of vendors develops, sells, and supports devices such as interactive voice response (IVR) systems, voice mail systems, e-mail gateways, fax servers, and automatic call distributors (ACDs). Many of these applications use emerging technologies such as voice compression and expansion, text-to-speech translation, automatic speech recognition, and facsimile-to-text translation.

As telephony applications have become more numerous and complex, interoperability problems have arisen. Further, it is difficult to develop integrated applications that combine features of different application-specific devices because they are developed by different vendors and often use proprietary software. Thus, a need arose for a framework for developing telephony applications in which vendors agree on certain aspects of implementation to allow interoperability of products and software. In response to this need, the Enterprise Computer Telephony Forum (ECTF) has defined such a framework. The ECTF framework provides the ability for computer telephony applications to share media resources (e.g., voice recognition). The ECTF has specified several application program interfaces (APIs), including S.100, which defines an interface between a media server and computer telephony applications.

Media servers compliant with the ECTF S.100 API provide a means for developing computer telephony applications in an open client-server environment with shared resources. The S.100 API is a hardware-independent and operating system-independent API. However, the S.100 API, based on the C programming language, is a language dependent interface, which makes S.100 ultimately dependent on the platform used. Also, current system architectures for providing telephony services do not take full advantage of object-oriented programming methods or use distributed processing, thus making it more difficult to extend architectures to include new components. Furthermore, current system architectures with distributed components utilize proprietary protocols.

SUMMARY OF THE INVENTION

A method consistent with the present invention provides access from a the client to a resource coupled to a server by transmitting from the client to the server an object-oriented, language-independent request to establish a session between the client and the server; transmitting from the client to the server an object-oriented, language-independent request to establish a group containing the resource, the group corresponding to the session; and transmitting from the client to the server an object-oriented, language-independent request to invoke a function on the,resource. A method consistent with the present invention further sets a parameter corresponding to the session for determining event callback behavior. A method consistent with the present invention further sets a parameter corresponding to the session for determining whether an event will be created.

A client consistent with the present invention comprises means for transmitting to a server an object-oriented, language-independent request to establish a session between the client and the server, means for transmitting to the server an object-oriented, language-independent request to establish a group containing a resource, coupled to the server, the group corresponding to the session, and means for transmitting to the server an object-oriented, language-independent request to invoke a function on the resource.

Additional features and advantages of the present invention will be readily appreciated by one of ordinary skill in the art from the following detailed description of the best mode for carrying out the invention when taken in connection with the accompanying drawings.

DETAILED DESCRIPTION OF THE PREFERRED EMBODIMENTS

An interface consistent with the present invention allows development of applications and services in a modular manner and provides for growth from a single node system to a multiple node system, in which services and applications can be located on various nodes throughout the system. Although the context of this description is that of media servers providing a development environment for telephony applications, it should be appreciated that the invention has a broader potential application, and may be used for development of other applications, such as applications on the World Wide Web.

Figure 1:
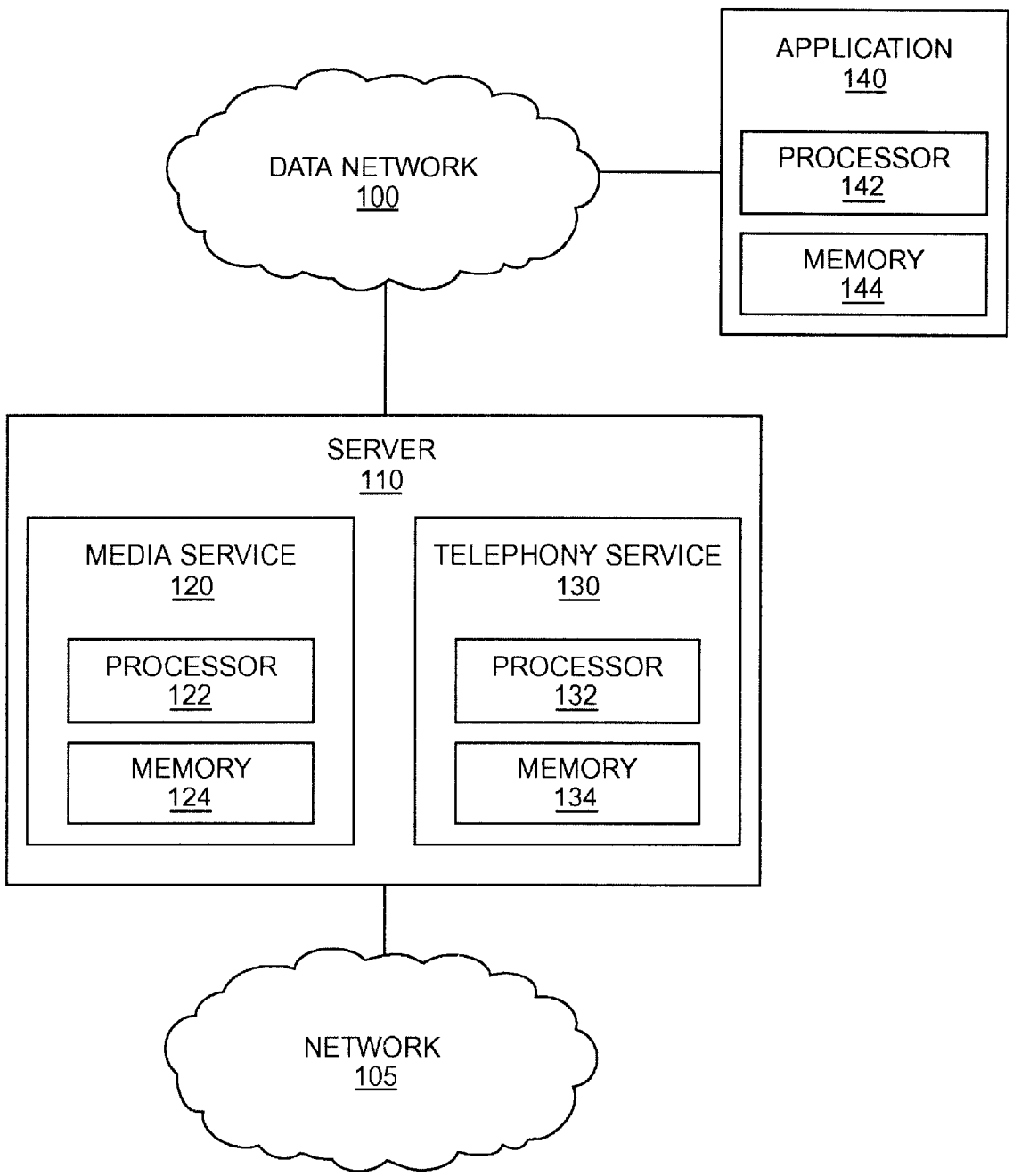
FIG. 1 is a high-level block diagram of a system architecture consistent with the present invention.

FIG. 1 illustrates a high-level block diagram of a system architecture consistent with the present invention. Network 100 may be any type of data network, including an Internet Protocol (IP) network. Server 100, which is a logical grouping of media service 120 and telephony service 130, is coupled to network 100. Consistent with the present invention, media service 120 and telephony service 130 provide interfaces to media and telephony objects that may be located anywhere in network 100. Media service 120 and telephony service 130 may be collocated on the same node or on separate nodes. Media services include services for media interactions, such as text-to-speech translation, interactive voice response, and speech recognition and verification. Telephony services include call control services (e.g., making calls, taking calls, transferring calls, and joining calls) and transaction handling services (e.g., making SS7 Transaction Capabilities Application Part (TCAP) queries).

Media service 120 and telephony service 130 are also coupled to network 105, which may be any type of telecommunications network, including a Public Switched Telephone Network (PSTN) or a private network. Media service 120 and telephony service 130 are coupled to network 105 using adapters (not shown) specific to network 105. For example, media service 120 can be connected to network 105 via a Dialogic T1 card.

Application 140, coupled to network 100, uses the interface provided by access media service 120 and telephony service 130. Application 140 invokes methods on media service 120 and/or telephony service 130. Application 140 does not have to be collocated with media service 120 or telephony service 130, although the present invention does not preclude the collocation of application 140 with either media service 120 or telephony service 130.

Media service 120, telephony service 130, and application 140 include processors 122, 132, and 142, respectively, and memories 124, 134, and 144, respectively. Processors 122, 132, and 142 may be provided by conventional microprocessor circuits. Memories 124, 134, and 144 may include both RAM and ROM portions and may be implemented with any type of computer-readable medium, such as any electronic, magnetic, or optical read/write storage device. Memories 124, 134, and 144 store data that serves as instructions to processors 122, 132, and 142, respectively, and which, when executed by processors 122, 132, and 142, cause media service 120, telephony service 130, and application 140 to carry out methods that are described below.

System Architecture

Figure 2:
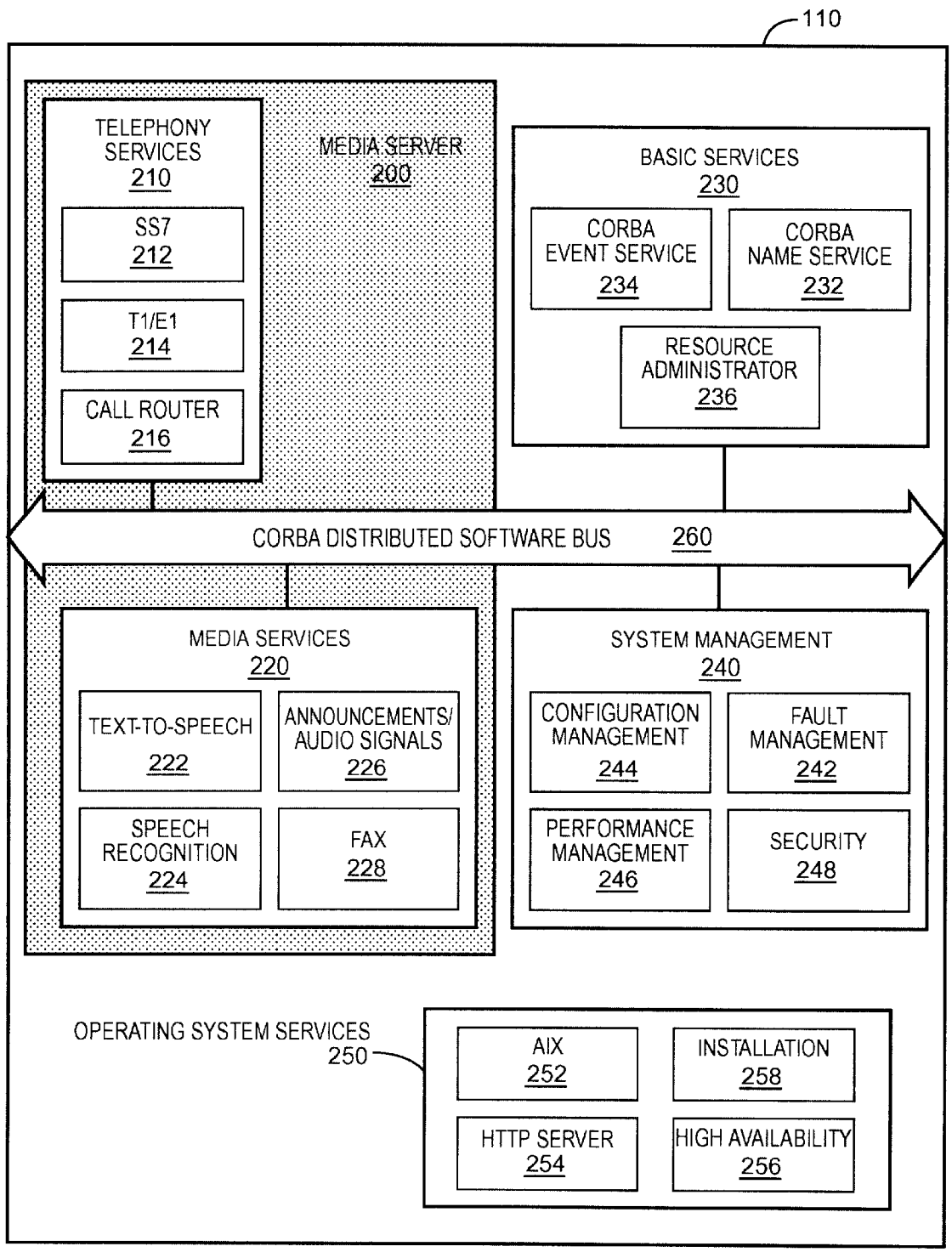
FIG. 2 illustrates a high-level software architecture of a server consistent with the present invention.

FIG. 2 illustrates a high-level software architecture of server 110 consistent with the present invention. Server 110 includes the following resources: media server 200, comprising telephony services interface 210 and media services interface 220; basic services portion 230; and system management portion 240. Server 110 also includes operating system services portion 250 and distributed software bus 260. A software architecture consistent with the present invention uses an object-oriented communication framework that provides location-transparent communication among the architectural components. The framework may be provided, for example, by Common Object Request Broker Architecture (CORBA), an industry standard architecture developed by the Object Management Group (OMG) for systems integration. Details of CORBA can be found at www.omg.org, which is hereby incorporated by reference.

In general, CORBA brings together object-oriented computing and distributed computing. A CORBA-based system is composed of cooperating objects on a software bus, which is called the object request broker (ORB). Each object has an interface, which in CORBA is an abstract, language-independent representation of the set of methods that can be understood by the object. Objects do not have to be collocated. Method invocations on remote objects occur through an underlying protocol, which can be specific to an ORB vendor or based on an industry standard. Referring to FIG. 2, distributed software bus 260 is an ORB, through which client applications interface with telephony services interface 210, media services interface 220, basic services portion 230, and system management portion 240. The ORB enables objects to make requests and receive responses transparently in a distributed environment.

CORBA 2.0 specifies an interoperability protocol, Internet Inter-ORB Protocol (IIOP), that allows objects implemented using one vendor's ORB to communicate with an object using another vendor's ORB. An application developer is shielded from all details of the lower-level interaction, including the locations of the objects and the marshaling (i.e., encoding to convert interfaces and parameters into flattened message formats to transfer over a network) and unmarshaling (i.e., decoding) of arguments.

Interface Definition Language (IDL) is essential to interoperability of components in a CORBA system. IDL is a neutral intermediate language that specifies a component's boundaries, interfaces with potential clients, or any description of a resource or service that the server component wants to expose to a client. IDL is not a programming language; it is instead a language for expressing interfaces.

Several commercial implementations of the CORBA standard exist. Orbix, developed by Iona Technologies, is one such implementation that may be used in methods and systems consistent with the present invention. Orbix consists of a CORBA 2.0-compliant object request broker (ORB), an IDL compiler, and related tools. The ORB mediates between clients and implementations of application objects and must provide a standard interface to such clients, and another to such implementations of application objects. The CORBA standard does not specify whether the ORB is a set of runtime libraries, a set of daemon processes, a server machine, or part of an operating system.

Orbix is implemented as a pair of libraries—one for client applications and one for servers—and the orbixd daemon. The orbixd daemon need only be present at nodes running CORBA servers, and it is responsible for launching server processes dynamically. Because of the library implementation of Orbix ORB, there is no central component through which all object requests must pass. Instead, object requests pass directly from the client (application) code to the invoked server object implementation. If the server and client are in different processes, the method invocation is marshalled in the client process, transmitted over an IP network, unmarshalled in the server process, and dispatched to the appropriate server object by the object adapter. The role of orbixd is to connect clients and servers for the first time. Since Orbix adheres to IIOP, the Orbix ORB can interoperate with any other ORB that also supports the standard IIOP.

Another important component of Orbix is its compiler technology, which translates CORBA IDL into programming language code, e.g., C++, that performs remote calls. The generated code is sufficiently sophisticated so that developers are not burdened with extra programming steps after translation.

Referring again to FIG. 2, operating system services portion 250 provides an underlying architecture that supports server 110. Consistent with the present invention, operating system 252 may be a UNIX operating system such as AIX 4.1.5, which is built on open standards including UNIX 95, XPG 4, and X/Open. Server 110 also includes standards-compliant HTTP server 254, which, in conjunction with graphical clients, provides a window into the system. High availability services 256 provide active and standby 10BaseT or 100BaseT Ethernet network interface cards (NICs). For applications that do not tolerate a single point of failure, network traffic is automatically switched to the standby NIC when failure of a NIC or external hub is detected. Installation services 258 provide the ability to install server 110 as a stand-alone unit or in a line-up.

FIG. 2 also shows basic services portion 230, which provides basic services available to applications and resources. CORBA name service 232 allows a resource developer to place resources at specified locations and allows other resources to find and access those resources by name. CORBA name service 232 may be implemented, for example, by OrbixNames, part of the Orbix product family. CORBA event service 234 allows objects to communicate in an event-driven style. The event service, which may be implemented using OrbixTalk, allows applications to determine which events are relevant to them and perform actions as required. The event service allows for decoupled design between generating and receiving events, which simplifies the implementation of object-oriented design and enhances scalability.

Consistent with the present invention, basic services portion 230 also includes resource administrator 236, which provides network-wide tracking of resources, which can be shared among applications. When a resource becomes available, it registers with resource administrator 236 by providing information including type and, optionally, any attributes or properties that distinguish it from other resources. Resources can query resource administrator 236 for the existence of resources by interface type and an optional list of properties. If several resources match a particular type, resource administrator 236 balances resource utilization by using a least-recently-used algorithm to determine which resource to use, and favors local resources over remote resources.

Resource administrator 236 tracks resource owners for resource recovery. This reduces the amount of maintenance required to attain a high level of system availability. Resource administrator 236 also provides a first line of security by allowing resources to access other resources only if authorized to do so.

Resource administrator 236 may be a multi-tiered service, including both local resource administrators and network-wide administrators. In this case, a local resource administrator tracks local, or nodal, resources, and queries a network-wide administrator if it cannot satisfy a request.

Media services interface 220 provides interfaces to media services including, for example, text-to-speech services (interface 222), speech recognition services (interface 224), announcements/audio signals services (interface 226), and facsimile services (interface 228). Telephony services interface 210 allows server 110 to interact with telecommunications network 105 and provides interfaces to telephony services including, for example, system call router interface 216 and interfaces to the SS7 signaling network (interface 212) and T1/E1 signaling (interface 214). Detailed implementations of these interfaces consistent with the present invention are discussed below.

Figure 3:
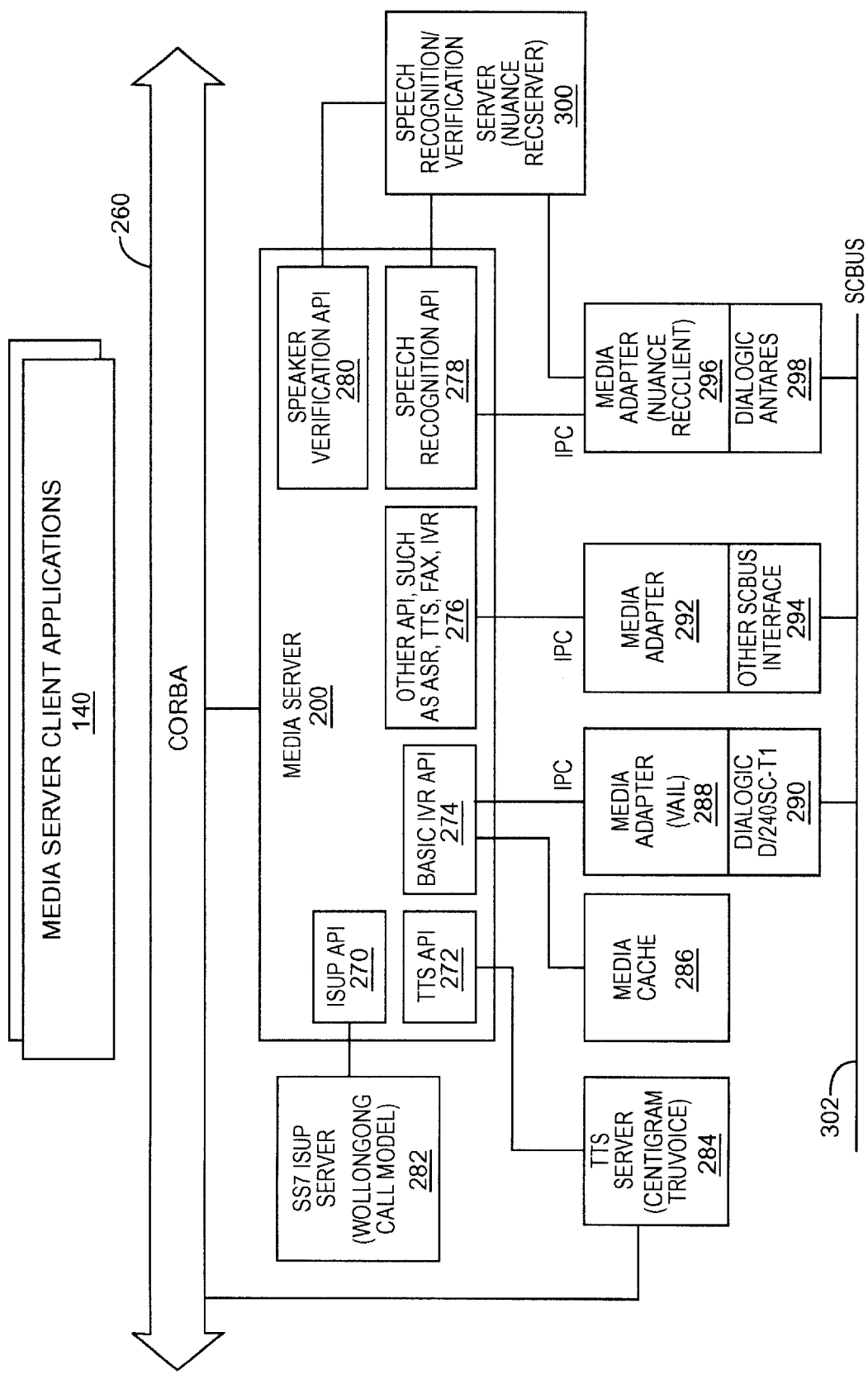
FIG. 3 illustrates a detailed internal structure of a media server consistent with the present invention and its interactions with applications and resources.

FIG. 3 illustrates a detailed internal structure of media server 200 and its interactions with applications and resources consistent with the present invention. In order to provide an interface to media services (interface 220) and to telephony services (interface 210) as shown in FIG. 2, media server 200 accesses hardware components that provide the functionality for such services. FIG. 3 shows several components that may be accessed by media server 200. For example, one telephony service that media server 200 may access is server 282, which provides SS7 ISDN User's Part (ISUP) signaling. SS7 ISUP application programming interface (API) 270 translates messages from media server 200 into SS7 ISUP messages and communicates the SS7 ISUP messages to SS7 ISUP server 282.

FIG. 3 also shows several components that provide media services and may be accessed by media server 200. For example, TTS server 284 provides text-to-speech translation and may be a commercially available TTS server such as Centigram's TruVoice® 5.1 or Eloquence Technologies Inc.'s Eloquent 2.0. Media server 200 accesses TTS server 284 through TTS API 272, which transports method requests and responses and asynchronous events between media server 200 and TTS server 284. FIG. 3 also shows speech recognition/verification server 300, which may be a commercially available speech recognition and verification server such as Nuance's RecServer™. Media server 200 accesses speech recognition/verification server 300 through speaker recognition API 278 and/or speaker verification API 280.

Speech recognition services may also be provided in hardware/firmware by speech recognition component 298, e.g., the Antares™ automatic speech recognition (ASR) platform, commercially available from Dialogic®. Speech recognition component 298 may be coupled to media adapter 296, e.g., Nuance's RecClient™, which provides a higher-level interface to speech recognition component 298. Media server 200 access speech recognition component 298 through speech recognition API 278, which accesses media adapter 296 via an interprocess communication capability.

Media server 200 may provide IVR service by accessing IVR component 290, which may be a commercially available product such as Dialogic® D/240SC-T1. Media server 200 accesses IVR component 290 through basic IVR API 274. IVR component 290 may be coupled to media adapter 288, which presents a higher-level interface to basic IVR API 274 and may be a commercially available product or a proprietary API, e.g., a media adapter provided by Nortel Server's Vail API. Media cache 286 provides cache storage for IVR applications.

Hardware components coupled to media server 200 may communicate with each other via time division multiplexed (TDM) bus 302, which may be an SCbus™ compliant with the Signal Computing System Architecture™ (SCSA) hardware model, an industry standard TDM architecture.

It should be apparent to one skilled in the art that the specific hardware components providing media or telephony services in FIG. 3 are exemplary only. Media server 200 may access any resource that provides functionality for a media or telephony service. Also, as shown in FIG. 3, media server 200 may include API 276 for any application such as ASR, TTS, IVR, or facsimile, that accesses media adapter 292, which accesses other hardware components connected to bus 302 via interface 294.

Referring again to FIG. 2, server 110 includes system management portion 240, which includes at least the following categories of system management based on the Open Systems Interconnection (OSI) system management definition: fault management portion 242, configuration management portion 244, performance management portion 246, and security portion 248. System management portion 240 provides the APIs and user interfaces (UIs) for applications, resources, network components, and hardware components utilizing server 110 to be managed in a consistent and extensible manner.

Fault management portion 242 provides a mechanism for generating, collecting, monitoring, and displaying fault events, such as logs and alarms. A fault event can be generated, for example, by an IDL API that is part of telephony services interface 210 or media services interface 220. Configuration management portion 244 provides mechanisms for system installation; software distribution, which provides the ability to define, administer, and distribute software and configuration data; resource state management, which allows applications and components with the environment of server 110 to be managed from an operations workstation and may be based on the ISO X.732 resource state model; and configuration (datafill) management, which allows applications to define, generate, and distribute configuration information and notify applications of configuration change events. Performance management portion 246 allows application to define, generate, collect, store, and display performance measurement information based on performance data generated by applications using an IDL API and collected into a database. Security portion 248 provides an interface to manage security information such as user accounts and passwords.

Application-Server Interface

Implementations of telephony services interface 210 and media services 220 interface consistent with the present invention will now be presented in more detail. Telephony services interface 210, shown in FIG. 2, allows application 140 to interact with telephone network 105 and provides a language-independent, location-independent, object-oriented interface to applications that require telephony access to the network. Media services interface 220, also shown in FIG. 2, allows application 140 to interact with media services, such as those provided by hardware components shown in FIG. 3, and provides a language-independent, location-independent, object-oriented interface to applications that require access to media services.

More specifically, media services interface 220 and telephony services interface 210 consistent with the present invention include IDL interfaces that allow applications to invoke the hardware resources connected to server 110. The IDL interfaces are based on the ECTF S.100 API, which is hereby incorporated by reference, but the IDL interfaces are implemented using a distributed object model such as CORBA. IDL interfaces consistent with the present invention are language-independent, whereas ECTF S.100 is implemented in the C programming language. The IDL interfaces that will be described may be part of either telephony services interface 210 or media services interface 220.

With reference to FIG. 3, all communication between application 140 and media server 200 occurs through a session, which enables application 140 to request functions from media server 200 and enables media server 200 to send events to application 140. A session provides an event queue by which application 140 receives events from media server 200. Events notify application 140 of command responses, execution errors, or changes in the system environment and include at least two types: (1) completion events, which are sent in response to a method call on an object, and (2) unsolicited events, which occur in response to changes in the system environment. An application can invoke methods on objects in synchronous mode, in which case the completion event contains data requested by the method and is returned in an output parameter, or in asynchronous mode, in which case the completion event contains data requested by the method and error information. The event queue contains both completion events and unsolicited events. Events can be handled directly by the application or by event handlers associated with the event queue.

After establishing a session with media server 200, application 140 may begin to perform media or telephony operations using hardware resources such as those shown in FIG. 3. Application 140 dynamically establishes a group containing one or more connected resources which appears to application 140 as a custom piece of hardware including, for example, speech recognition capability and recording capability. More than one group can be established in one session, and application 140 can establish a connection between groups that allows data originating in a resource of one group to be received by a resource in another group.

Application 140 utilizes several IDL APIs consistent with the present invention to establish and manage sessions, groups, and connections. The SessionFactory IDL API is used to create new sessions and contains only one method, newSession. When invoked by application 140, this method creates a new session and returns a pointer to the new session object. The GroupFactory IDL API is used to create new groups of resources and contains two methods: newGroup, called in synchronous mode, and newGroupAsync, called in asynchronous mode. Both methods create a new group and hand it off to the session object specified by a parameter. The session object must exist on the same media server as the newly created group. The newGroup method returns a pointer to the new group object. The ConnectionFactory IDL API is used to create new connections between groups and contains two methods: newConnection, called in synchronous mode, and newConnectionAsync, called in asynchronous mode. Both methods can establish a one-way connection or a two-way connection between groups.

Consistent with the present invention, the methods of the SessionFactory, GroupFactory, and ConnectionFactory IDL APIs are accessed through a main interface to media server 200. This interface is referred to herein as the OMSServer IDL API and inherits from the SessionFactory, GroupFactory, and ConnectionFactory interfaces. The OMSServer IDL API itself contains no methods. Another IDL, API the OMSServerFactory, contains one method, _new, that enables application 140 to acquire a handle to media server 200.

Once a session has been established, the Session IDL API provides a logical binding between application 140 and media server 200. As noted earlier, the session provides an event queue by which application 140 receives events from media server 200. An event is a key value set (KVS), which consists of a sequence of keys and values. All events have the following standard keys, which are based on the standard keys of the S.100 interface, and which describe components of the event message:

| Key | Description |
| --- | --- |
| Message_ECTF_EventID | Identifies the event. |
| Message_ECTF_EventQualifier | Provides additional information to identify the event. |
| Message_ECTF_ObjectID | Identifies the object that originated the event. |
| Message_ECTF-ObjectClass | Identifies the type of the ObjectID |
| Message_ECTF_SessionID | Identifies the session to which the event was delivered. |
| Message-ECTF_ACT | Identifies the application context token of the session. |
| Message_ECTF_Status | Identifies the error status in an asynchronous request. |
| Message_ECTF_Error | Identifies the error code in an asynchronous request. |
| Message_ECTF_SubError | Provides additional error information in an asynchronous request. |
| Message_ECTF_TransactionID | Identifies the asynchronous request associated with this event. |

In addition, some methods trigger events that include event-specific keys.

Data used by methods is in the form of a key value set (KVS), which contains a sequence of keys associated with values. For example, an event is a KVS that contains a sequence of event keys, where each event key represents an attribute of the event. Structurally, a KVS is a sequence of key value pairs (KVPairs). The sequence of KVPairs is stored in a KVSeq.

The Session IDL API includes the following methods, which are based on similar methods specified in the ECTF S.100 API, but are defined using IDL, thereby allowing for a platform-independent and language-independent implementation:

createHandler, described in IDL as:
    EventHandler createHandler (in KVSeq match,
        in Callback handler,
        in HCT hct)
        raises (CTException);

The createhandler method, called in synchronous mode, creates an event handler and specifies the criteria by which to filter events received in a session event queue. This method is based on the CTses_CreateHandler function of S.100. Events that match the criteria specified in the parameter "match" are processed by this event handler; events that do not match are passed to another event handler or removed from the event queue. The parameter "handler" identifies the application object that is called when an event is matched. The parameter "hct" identifies an application-defined token that is passed as an argument to the event handler. This method returns an event handler object and triggers an event that contains the standard event keys. Errors indicating that the combination of values for "match," "handler," and "hct" is not unique are returned in CTException.

createHandlerAsync, described in IDL as:
    oneway void createHandlerAsync (in KVSeq match,
        in Callback handler,
        in HCT hct
        in CTuint tranId);

The createHandlerAsync method, called in asynchronous mode, creates an event handler and specifies the criteria by which to filter events received in a session event queue. The equivalent function in S.100, CTses_CreateHandler, cannot be called in asynchronous mode. Events that match the criteria specified in the parameter "match" are processed by this event handler; events that do not match are passed to another event handler or removed from the event queue. The parameter "handler" identifies the application object that is called when an event is matched. The parameter "hct" identifies an application-defined token that is passed as an argument to the event handler. The parameter "tranId" identifies an asynchronous context token that is returned in the completion event, enabling the completion event to be matched to the request. This method triggers an event that contains the standard event keys plus a key containing the newly created event handler. Errors indicating that the combination of values for "match," "handler," and "hct" is not unique are returned in the completion event.

getParameters, described in IDL as:
    KVSeq getParameters (in KeyArray keys,
        out KVSeq tranInfo)
        raises (CTException);

The getParameters method, called in synchronous mode, gets the current values of the session parameters. This method is based on the CTses_GetParameters function of S.100. The parameter "keys" identifies the parameters for which to return values. The parameter "tranInfo" contains the completion event that caused the method call to return. This method returns a key value pair for each returned session parameter and triggers an event that includes the standard keys. A warning is returned if a key is specified that is not a session parameter.

getParametersAsync, described in IDL as:
    oneway void getParametersAsync (in KeyArray keys,
        in CTuint tranId);

The getParametersAsync method, called in asynchronous mode, gets the current values of the session parameters. This method is based on the CTses_GetParameters function of S.100. The parameter "keys" identifies the parameters for which to return values. This method triggers an event that includes the standard keys plus a key containing key value pairs for each returned session parameter. If an error occurs, it is returned in the completion event key Message_ECTF_Error.

putEvent, described in IDL as:
    void putEvent (in KVSeq event)

The putEvent method, called in synchronous mode, places an event on the session event queue for standard event processing. This method is based on the CTses_PutEvent function of S.100. The parameter "event" contains the event.

putEventAsync, described in IDL as:
    oneway void putEventAsync (in KVSeq event);

The putEventAsync method, called in asynchronous mode, places an event on the session event queue for standard event processing. The equivalent function in S.100, CTses_PutEvent function, cannot be called in asynchronous mode. The parameter "event" contains the event.

setParameters, described in IDL as:
    void setParameters (in KVSeq parmList,
        out KVSeq tranInfo)
        raises (CTException);

The setParameters method, called in synchronous mode, sets the session parameters. This method is based on the CTses_SetParameters function of S.100. The parameter "parmList" identifies a key value set of parameters for the session. An immediate handler key indicates whether events that match the handler's criteria will be called back immediately. An event options key indicates whether an event will be created or whether an event will be placed on event queue, or specifies which keys will be reported. Both the immediate handler option as well as the event options are enhancements to the S.100 standard. These enhancements consistent with the present invention allow the Media Server 200 to operate more efficiently. The parameter "tranInfo" contains the completion event that caused the method call to return. This method triggers an event that includes the standard keys. A warning is returned if a key is specified that is not a session parameter. If a key has an invalid value, an error is returned in CTException.

setParametersAsync, described in IDL as:
    oneway void setParametersAsync (in KVSeq parmList,
        in CTuint tranId);

The setParametersAsync method, called in asynchronous mode, sets the session parameters. This method is based on the CTses_SetParameters function of S.100. The parameter "parmList" identifies a key value set of parameters for the session. An immediate handler key indicates whether events that match the handler's criteria will be called back immediately. An event options key indicates whether an event will be created or whether an event will be placed on event queue, or specifies which keys will be reported. This method triggers an event that includes the standard keys. If an error occurs, it is returned in the completion event keys Message_ECTF_Error and Message_ECTF_SubError.

waitEvent, described in IDL as:

```
CTbool waitEvent (in CTint timeout,
    out KVSeq tranInfo)
    raises (CTException);
```
The waitEvent method returns the next event from the session event queue, if an event is received within the time period specified by the parameter "timeout." This method is based on the CTses_WaitEvent function of S.100. The parameter "tranInfo" contains the completion event that caused the method call to return. The method returns true if the event was received, and false otherwise.

waitGroup, described in IDL as:
```
    Group waitGroup (out ACT act,
        in CTint timeout,
        out KVSeq tranInfo)
        raises (CTException);
```
The waitgroup method returns the next group that is received by the session, if a group is received within the time period specified by the parameter "timeout." This method is based on the CTgrp_WaitGroup function of S.100. The parameter "tranInfo" contains the completion event that caused the method call to return. The parameter "act" contains the application context token of the group. The method returns the group received by the session.

The CallBack IDL API is used to define callback objects, which are contained in event handlers. The callback object processes events. The server matches events to event handlers in reverse order of event handler creation. If an event matches an event handler, the server invokes the callback object of the matching event handler. The callback object returns a value that indicates whether the event requires further processing. The event is passed to matching event handlers until there are no more matching event handlers or the callback object indicates that the event requires no further processing. The callback object is implemented by providing code for the object in the client application.

The CallBack IDL API includes the handle method, described in IDL as:
```
    boolean handle(inout KVSeq event,
        in HCT hct);
```
The handle method processes an event received by the callback object. The parameter "event" identifies the event received by the callback object. The parameter "hct" identifies the handler context token of the event handler, specified in the createHandler method of the Session interface.

Once a group has been established within a session, the Group IDL API manages the allocation and configuration of resources into groups. The Group IDL API includes the following methods, which are based on similar methods specified in the ECTF S.100 API, but are defined using IDL, thereby allowing for a platform-independent and language-independent implementation. Similar to the Session IDL API methods described above, many functions actually have two methods, one called in synchronous mode and one called in asynchronous mode. The methods called in synchronous mode return the completion event in the output parameter "tranInfo" and return errors in CTException. The methods called in asynchronous mode return errors in an event passed to the session. All parameters have the same meaning as those described in ECTF S.100, except as otherwise noted.

allocate, described in IDL as:
```
    void allocate (in string resourceName,
        in CTint timeout,
        in KVSeq parmList,
        out KVSeq tranInfo)
        raises (CTException);
```
The allocate method indicates to media server 200 that a configured resource is to be allocated to the group. Consistent with the present invention, the parameter "resourceName" identifies the resource to allocate to a group. An example of an accepted value is "NuanceRegognizer," which identifies the Nuance speech recognition resource. The parameter "parmList" accepts, for example, key value pairs identifying the name of a speech recognition package that contains grammars defining utterances recognized by the speech recognition resource. The method triggers an event containing the standard event keys plus event-specific keys identifying a reference to the group and identifying an application context token.

allocateAsync, described in IDL as:
```
    oneway void allocateAsync (in string resourceName,
        in long timeout,
        in KVSeq parmList,
        in CTuint tranId);
```
This method is the asynchronous version of the allocate method. The method triggers an event containing the standard event keys plus event-specific keys identifying a reference to the group and identifying an application context token.

configure, described in IDL as:
```
    void configure (in string groupConfig,
        in ACT act,
        in CTint timeout,
        in KVSeq parmList,
        out KVSeq tranInfo)
        raises (CTException);
```
The configure method configures dynamic resources allocated to a group. The method triggers an event containing the standard event keys plus event-specific keys identifying a reference to the group and identifying an application context token.

configureAsync, described in IDL as:
```
    oneway void configureAsync (in string groupConfig,
        in ACT act,
        in CTint timeout,
        in KVSeq parmList,
        in CTuint tranId);
```
This method is the asynchronous version of the configure method. The method triggers an event containing the standard event keys plus event-specific keys identifying a reference to the group and identifying an application context token.

deallocate, described in IDL as:
```
    void deallocate (in string resourceName,
        in CTint timeout,
        in KVSeq parmList
        out KVSeq tranInfo)
        raises (CTException);
```
The deallocate method indicates to media server 200 that a configured resource is to be deallocated from the group. The method triggers an event containing the standard event keys plus event-specific keys identifying a reference to the group and identifying an application context token.

deallocateAsync, described in IDL as:
```
    oneway void deallocateAsync (in string resourceName,
        in CTint timeout,
        in KVSeq parmList,
        in CTuint tranId);
```
This method is the asynchronous version of the deallocate method. The method triggers an event containing the standard event keys plus event-specific keys identifying a reference to the group and identifying an application context token.

getGroupInfo, described in IDL as:

KVSeq getGroupInfo (in KeyArray keys,
   out KVSeq tranInfo)
   raises (CTException);
The getGroupInfo method obtains user information specific to the group. The method returns a copy of the application KVSeq. The method triggers an event containing the standard event keys plus event-specific keys identifying a reference to the group and identifying an application context token.
getGroupInfoAsync, described in IDL as:
   oneway void getGroupInfoAsync (in KeyArray keys,
      in CTuint tranId);
This method is the asynchronous version of the getGroupInfo method. The method triggers an event containing the standard event keys plus event-specific keys identifying a reference to the group, identifying an application context token, and identifying a return value.
getParameterNames, described in IDL as:
   KVSeq getParameterNames (in KeyArray keys,
      out KVSeq tranInfo)
      raises (CTException);
The getParameterNames method queries the existence of parameters for resources specific to the group. The method returns a KVSeq of key and value pairs where each key is a parameter name and each value is true or false, indicating whether the named parameter is supported by a resource in the group. The method triggers an event containing the standard event keys plus event-specific keys identifying a reference to the group and identifying an application context token.
getParameterNamesAsync, described in IDL as:
   oneway void getParameterNamesAsync (in KeyArray keys,
      in CTuint tranId);
This method is the asynchronous version of the getParameterNames method. The method triggers an event containing the standard event keys plus event-specific keys identifying a reference to the group, identifying an application context token, and identifying a return value.
getParameterRange, described in IDL as:
   KVSeq getParameterRange (in KeyArray keys,
      out KVSeq tranInfo)
      raises (CTException);
The getParameterRange method obtains the range of parameter values for resources specific to the group. The method returns a KVSeq of key and value pairs where each key is a parameter name and each value is either a single value, an array of values, or a numeric range, representing the range of possible values for the named parameter. The method triggers an event containing the standard event keys plus event-specific keys identifying a reference to the group and identifying an application context token.
getParameterRangeAsync, described in IDL as:
   oneway void getParameterRangeAsync (in KeyArray keys,
      in CTuint tranId);
This method is the asynchronous version of the getParameterRange method. The method triggers an event containing the standard event keys plus event-specific keys identifying a reference to the group, identifying an application context token, and identifying a return value.
getParameters, described in IDL as:
   KVSeq getParameters (in KeyArray keys,
      outKVSeq tranInfo)
      raises (CTException);
The getParameters method obtains the settings of parameters for resources specific to the group. The method returns a KVSeq of key and value pairs where each key is a parameter name and each value represents a parameter value. The method triggers an event containing the standard event keys plus event-specific keys identifying a reference to the group and identifying an application context token.
getParametersAsync, described in IDL as:
   oneway void getParametersAsync (in KeyArray keys,
      in CTuint tranId);
This is the asynchronous version of the getParameters method. The method triggers an event containing the standard event keys plus event-specific keys identifying a reference to the group, identifying an application context token, and identifying a return value.
getRTC, described in IDL as:
   KVSeq getRTC (out KVSeq tranInfo)
      raises (CTException);
The getRTC method obtains the current runtime control (RTC) setting on the group. The method returns a KVSeq identifying the runtime controls on the group. The method triggers an event containing the standard event keys plus event-specific keys identifying a reference to the group and identifying an application context token.
getRTCAsync, described in IDL as:
   oneway void getRTC Async (in CTuint tranId);
This method is the asynchronous version of the getRTC method. The method triggers an event containing the standard event keys plus event-specific keys identifying a reference to the group, identifying an application context token, and identifying a return value.
handoff, described in IDL as:
   void handoff (in string ASI,
      in string tag,
      in CTint timeout,
      in KVSeq parmList,
      out KVSeq tranInfo)
      raises (CTException);
The handoff method passes a group to another session. During handoff, events received by the group are queued for delivery to the session that controls the group at the completion of the handoff method call. The method triggers a handoff event sent to the session initiating the handoff and containing the standard event keys plus event-specific keys identifying a reference to the group and identifying an application context token. The method also triggers an arrival event sent to the session receiving the handoff and containing the standard event keys plus event-specific keys identifying a reference to the group and identifying an application context token.
handoffAsync, described in IDL as:
   void handoffAsync (in string ASI,
      in string tag,
      in CTint timeout,
      in KVSeq parmList,
      in CTuint tranId);
This is the asynchronous version of the handoff method. The events are the same as those triggered by the handoff method.
putGroupInfo, described in IDL as:
   void putGroupInfo (in KVSeq kvs,
      out KVSeq tranInfo)
      raises (CTException);
The putGroupInfo method sets the contents of the group KVSeq. The method triggers an event containing the standard event keys plus event-specific keys identifying a reference to the group and identifying an application context token.

putGroupInfoAsync, described in IDL as:
   oneway void putGroupInfoAsync (in KVSeq kvs,
      in CTuint tranId);
This method is the asynchronous version of the putGroupInfo method. The method triggers an event containing the standard event keys plus event-specific keys identifying a reference to the group and identifying an application context token.
retrieve, described in IDL as:
   void retrieve (in Key cause,
      in CTint timeout,
      in KVSeq parmList,
      out KVSeq tranInfo)
      raises (CTException);
The retrieve method retrieves a group that has been handed off without waiting for the group to be handed back by the current owning session. The method triggers an event containing the standard event keys plus an event-specific key identifying the reason for the group retrieval.
retrieveAsync, described in IDL as:
   oneway void retrieveAsync (in Key cause,
      in CTint timeout,
      in KVSeq parmList,
      in CTuint tranId);
This is the asynchronous version of the retrieve method. The method triggers an event containing the standard event keys plus an event-specific key identifying the reason for the group retrieval.
returnGroup, described in IDL as:
   void returnGroup (in string tag,
      in CTint timeout,
      in KVSeq parmList,
      outKVSeq tranInfo)
      raises (CTException);
The returnGroup method returns a group to the previous owner on the owner stack. The method triggers an event containing the standard event keys plus event-specific keys identifying a reference to the group and identifying an application context token.
returnGroupAsync, described in IDL as:
   oneway void returnGroupAsync (in string tag,
      in CTint timeout,
      in KVSeq parmList,
      in CTuint tranId;
This method is the asynchronous version of the returnGroup method. The method triggers an event containing the standard event keys plus event-specific keys identifying a reference to the group and identifying an application context token.
setParameters, described in IDL as:
   void setParameters (in KVSeq parmList,
      out KVSeq tranInfo)
      raises (CTException);
The setParameters method sets the parameters of the group. The "parmList" parameter contains key and value pairs that identify parameters to set for each resource in the group. The method triggers an event containing the standard event keys plus event-specific keys identifying a reference to the group and identifying an application context token.
setParametersAsync, described in IDL as:
   oneway void setParametersAsync (in KVSeq parmList,
      in CTuint tranId;
This method is the asynchronous version of the setParameters method. The method triggers an event containing the standard event keys plus event-specific keys identifying a reference to the group and identifying an application context token.

setRTC, described in IDL as:
   void setRTC (in KVSeq rtc,
      out KVSeq tranInfo)
      raises (CTException);
The setRTC method sets persistent group-level runtime controls (RTC) that remain in effect for the duration of the group or until the setRTC method is called again with the "rtc" parameter set to null. The method triggers an event containing the standard event keys plus event-specific keys identifying a reference to the group and identifying an application context token.
setRTCAsync, described in IDL as:
   oneway void setRTCAsync (in KVSeq rtc,
      in CTuint tranId);
This method is the asynchronous version of the setRTC method. The method triggers an event containing the standard event keys plus event-specific keys identifying a reference to the group and identifying an application context token.
stop, described in IDL as:
   void stop(out KVSeq tranInfo)
      raises (CTException);
The stop method causes all resources to stop current operation. The method triggers an event containing the standard event keys.
stopAsync, described in IDL as:
   oneway void stopAsync (in CTuint tranId);
This is the asynchronous version of the stop method. The method triggers an event containing the standard event keys.

Once groups have been established within a session, connections can be made between groups using the Connection IDL API consistent with the present invention. The Connection IDL API manages connections between groups. An active two-way connection can only be established between two groups. Once a two-way connection is established, any number of listening groups can be connected to either side of the two-party conversation. A listening group has a connection that is configured to send data only in one direction, from the existing group to the listening group.

The Connection IDL API includes the following methods, which are based on similar methods specified in the ECTF S.100 API, but are defined using IDL, thereby allowing for a platform-independent and language-independent implementation. Similar to the Session and Group IDL API methods described above, the Connection functions actually have two methods, one called in synchronous mode and one called in asynchronous mode. The methods called in synchronous mode return the completion event in the output parameter "tranInfo" and return errors in CTException. The methods called in asynchronous mode return errors in an event key. All parameters have the same meaning as those described in ECTF S.100, except as otherwise noted.
break, described in IDL as:
   void break (in CTuint dir,
      out KVSeq tranInfo)
      raises (CTException);
The break method deactivates a connection. The "dir" parameter indicates the direction of the connection to deactivate, from among (a) data flowing from a group to a target, (b) data flowing from a target to a group, and (c) data flowing in both directions. The method triggers an event containing the standard event keys plus event-specific keys identifying the deactivated connection object, identifying the direction in which the connection was deactivated, and identifying an application context token.

breakAsync, described in IDL as:
    oneway void breakAsync (in CTuint dir,
        in CTuint tranId);
This method is the asynchronous version of the break method. The events are the same as those triggered by the break method.
make, described in IDL as:
    void make (in CTuint dir,
        out KVSeq tranInfo)
        raises (CTException);
The make method activates a connection. The "dir" parameter indicates the direction of the connection to activate, from among (a) data flowing from a group to a target, (b) data flowing from a target to a group, and (c) data flowing in both directions. The method triggers an event containing the standard event keys plus event-specific keys identifying the activated connection object, identifying the direction in which the connection was activated, and identifying an application context token.
makeAsync, described in IDL as:
    oneway void makeAsync (in CTuint dir,
        in CTuint tranId);
This method is the asynchronous version of the make method. The events are the same as those triggered by the make method.

Consistent with the present invention, media services interface 220 of media server 200 includes IDL APIs that enable application 140 to access various media resources. These interfaces includes the Player, Recognizer, Recorder, SignalDetector, and SignalGenerator, which can all be part of a group. Each interface includes methods that are based on similar methods specified in the ECTF S.100 API, but are defined using IDL, thereby allowing for a platform-independent and language-independent implementation. Similar to the IDL methods described above, many functions actually have two methods, one called in synchronous mode and one called in asynchronous mode. The methods called in synchronous mode return the completion event in the output parameter "tranInfo" and return errors in CTException. The methods called in asynchronous mode return errors in an event key. All parameters have the same meaning as those described in ECTF S.100, except as otherwise noted.

The Player interface allows an application to invoke the player resource of a group to play announcements during a call and includes the following methods:
play, described in IDL as:
    void play (in TVMArray tvmList,
        in long offset,
        in KVSeq rtc,
        in KVSeq parmList,
        out KVSeq tranInfo)
        raises (CTException);
The play method invokes the play function on media server 200. The parameter "tvmList" identifies the announcement files to be played. The parameter "offset" specifies the number of bytes to skip forward from the beginning of each file. The parameter "rtc" identifies key and value pairs for non-persistent runtime control that contain actions for the player resource, including pause, resume, and stop. The parameter "parmList" identifies key and value pairs for parameters of the player resource, such as the audio format for announcements, e.g., the type of pulse code modulation algorithm used. The method triggers an event containing the standard event keys plus event-specific keys identifying the reason the event was generated, e.g., by runtime control or because the player resource reached the end of data to play.
playAsync, described in IDL as:
    oneway void playAsync (in TVMArray tvmList,
        in long offset,
        in KVSeq rtc,
        in KVSeq parmList,
        CTuint tranID);
This method is the asynchronous version of the play method. The method triggers an event containing the standard event keys plus event-specific keys identifying the reason the event was generated and containing error codes.

The Recognizer interface allows an application to invoke the recognizer resource of a group to perform speech recognition on a recorded speech sample. To use speech recognition, an application makes a speech recognition request, i.e., initiates speech recognition on a group that contains a recognizer resource. The application retrieves the result of the request, which is returned as a string representing the interpreted utterance. The Recognizer interface also allows an application to configure speech recognition grammars, which define the valid phrases recognized by the recognizer resource and are saved in a grammar specification file.

The Recognizer interface includes the following methods:
contextCommit, described in IDL as:
    void contextCommit (in string resourceContext,
        in KVSeq parmList,
        out KVSeq tranInfo)
        raises (CTException);
The contextCommit method commits a dynamic grammar context to the recognition server resource. The method triggers an event containing the standard event keys.
contextCommitAsync, described in IDL as:
    oneway void contextCommitAsync (in string resourceContext,
        in KVSeq parmList,
        out KVSeq tranInfo)
        in CTuint TranId);
This method is the asynchronous version of the contextCommit method. The method triggers an event containing the standard event keys.
contextCopy, described in IDL as:
    void contextCopy (in string containerContext,
        in string resourceContext,
        in Direction direction,
        in KVSeq parmList,
        out KVSeq tranInfo)
        raises (CTException);
The contextCopy method copies the contents of an existing recognition context into a container specified by the parameter "containerContext," or the contents of a container into a recognition context specified by the parameter "resourceContext." The parameter "direction" indicates the direction of the transfer. The method triggers an event containing the standard event keys.
contextCopyAsync, described in IDL as:
    oneway void contextCopyAsync (in string containerContext,
        in string resourceContext,
        in Direction direction,
        in KVSeq parmList,
        in CTuint tranId;
This method is the asynchronous version of the contextCopy method. The method triggers an event containing the standard event keys.
contextCreate, described in IDL as:
    void contextCreate (in string resourceContext,
        in KVSeq parmList, out KVSeq tranInfo)
raises (CTException);

The contextCreate method creates a new recognition context that identifies a dynamic grammar used by application 140. The method triggers an event containing the standard event keys.

contextCreateAsync, described in IDL as:
oneway void contextCreateAsync (in string resourceContext,
in KVSeq parmList,
in CTuint tranId;

This method is the asynchronous version of the contextCreate method. The method triggers an event containing the standard event keys.

contextRemove, described in IDL as:
void contextRemove (in string resourceContext,
in KVSeq parmList,
out KVSeq tranInfo)
raises (CTException);

The contextRemove method removes a recognition context. The method triggers an event containing the standard event keys.

contextRemoveAsync, described in IDL as:
oneway void contextRemoveAsync (in string resourceContext,
in KVSeq parmList,
in CTuint tranId);

This method is the asynchronous version of the contextRemove method. The method triggers an event containing the standard event keys.

retrieveRecognition, described in IDL as:
KVSeq retrieveRecognition (in ResultType resultType,
in KVSeq rtc,
in KVSeq parmList,
out KVSeq tranInfo)
raises (CTException);

The retrieveRecognition method retrieves the result of speech recognition. The method returns key and value pairs with the results of the speech recognition request. Results include a string value representing the spoken utterance, an indication of whether natural language statements were specified in the selected grammar, strings representing the natural language interpretation, and a confidence value for the accuracy of the interpretation. The method triggers an event containing the standard event keys.

retrieveRecognitionAsync, described in IDL as:
oneway void KVSeq retrieveRecognitionAsync (in ResultType resultType,
in KVSeq rtc,
in KVSeq parmList,
in CTuint tranId);

This method is the asynchronous version of the retrieveRecognition method. The method triggers an event containing the standard event keys and event-specific keys containing the error state of the recognizer resource, a string value representing the spoken utterance, an indication of whether natural language statements were specified in the selected grammar, strings representing the natural language interpretation, and a confidence value for the accuracy of the interpretation.

startRecognition, described in IDL as:
void startRecognition (in KVSeq rtc,
in KVSeq parmList,
out KVSeq tranInfo)
raises (CTException);

The startRecognition method puts the recognizer resource in recognizing state. The "parmList" parameter identifies parameters for the recognizer resource, including the length of time to wait for speech, the maximum time to wait for a valid utterance, and the length of silence to determine the end of speech. The method triggers an event containing the standard event keys.

startRecognitionAsync, described in IDL as:
oneway void startRecognitionAsync (in KVSeq rtc,
in KVSeq parmList,
in CTuint tranId);

This method is the asynchronous version of the startRecognition method. The method triggers an event containing the standard event keys plus an event-specific key containing the error state of the recognizer resource.

wordCreate, described in IDL as:
void wordCreate (in string wordName,
in string wordString,
in string resourceContext,
in KVSeq parmList,
out KVSeq tranInfo)
raises (CTException);

The wordCreate method adds word objects to a recognition context to define the allowable words that are recognized. A word object indicates the label and pronunciation associated with a spoken phrase. The "wordName" parameter identifies the label of the word. The "wordString" parameter specifies the string associated with the word when the word is recognized. The "resourceContext" parameter specifies the name of the recognition context in which to create the word. The method triggers an event containing the standard event keys.

wordCreateAsync, described in IDL as:
oneway void wordCreateAsync (in string wordName,
in string wordString,
in string resourceContext,
in KVSeq parmList,
in CTuint tranId);

This method is the asynchronous version of the wordCreate method. The method triggers an event containing the standard event keys.

wordDestroy, described in IDL as:
void wordDestroy (in string wordName,
in string resourceContext,
in KVSeq parmList,
out KVSeq tranInfo)
raises (CTException);

The wordDestroy method deletes a word from a recognition context. The method triggers an event containing the standard event keys.

wordDestroyAsync, described in IDL as:
oneway void wordDestroyAsync (in string wordName,
in string resourceContext,
in KVSeq parmList,
in CTuint tranId);

This method is the asynchronous version of the wordDestroy method. The method triggers an event containing the standard event keys.

The Recorder interface allows an application to invoke the recorder resource of a group to record audio during a call and includes the following methods:

record, described in IDL as:
void record (in String tvm,
in KVSeq rtc,
in KVSeq parmList,
out KVSeq tranInfo)
raises (CTException);

The record method invokes the record function on media server 200. Audio data is recorded on a channel associated with the specified group. The parameter "tvm" identifies the file in which to record audio data. The parameter "rtc" identifies key and value pairs for non-persistent runtime control that contain actions for the recorder resource, including pause, resume, and stop. The parameter "parmList" identifies key and value pairs for parameters of the record resource, such as the maximum duration to record, the maximum silence before the recorder resource stops recording, and the audio format for recording announcements, e.g., the type of pulse code modulation algorithm used. The method triggers an event containing the standard event keys plus event-specific keys identifying the reason the event was generated, e.g., by runtime control, because the recorder timer expired, because the silence threshold was reached, or because no speech was detected. recordAsync, described in IDL as:

oneway void recordAsync (in String tvm,
in KVSeq rtc,
in KVSeq parmList,
CTuint tranID);

This method is the asynchronous version of the record method. The method triggers an event containing the standard event keys plus event-specific keys identifying the reason the event was generated and containing error codes.

The SignalGenerator interface allows an application to invoke the signal generator resource of a group to send dual tone multifrequency (DTMF) signals over a call channel and includes the following methods:
sendSignals, described in IDL as:

void sendSignals (in String signals,
in KVSeq rtc,
out KVSeq tranInfo)
raises (CTException);

The sendSignals method instructs the signal generator resource to send the specified string of signals. The parameter "rtc" identifies a key and value pair for non-persistent runtime control that contains a stop action. The method triggers an event containing the standard event keys plus event-specific keys identifying the reason the event was generated, e.g., by runtime control or by a stop command.
sendSignalsAsync, described in IDL as:

oneway void sendSignalsAsync (in String signals,
in KVSeq rtc,
CTuint tranID);

This method is the asynchronous version of the sendSignals method. The method triggers an event containing the standard event keys plus event-specific keys identifying the reason the event was generated and containing error codes.

The SignalDetector interface allows an application to invoke the signal detector resource of a group to detect signals during a call and includes the following methods:
flushBuffer, described in IDL as:

void flushBuffer (out KVSeq tranInfo)
raises (CTException);

The flushBuffer method instructs the signal detector resource to clear its internal signal buffer. The method triggers an event containing the standard event keys plus event-specific keys identifying the reason the event was generated, e.g., by runtime control.
flushBufferAsync, described in IDL as:

oneway void flushBuffer ( );

The flushBufferAsync is the asynchronous version of the flushBuffer method. The method triggers an event containing the standard event keys plus event-specific keys identifying the reason the event was generated, e.g., by runtime control, and containing error codes.

retrieveSignals, described in IDL as:

void retrieveSignals (in unsigned long numSignals,
in unsigned long patterns,
in KVSeq rtc,
out KVSeq tranInfo)
raises (CTException);

The retrieveSignals method instructs the signal detector resource to begin detecting signals. If buffering is enable, then detected signals are stored in a signal buffer and matched against user-defined patterns or templates. The "numSignals" parameter specifies the number of signals to detect. The "patterns" parameter specifies a bitmask of patterns that detected signals must match in order for the method call to complete successfully. The parameter "rtc" identifies key and value pairs for non-persistent runtime control that contain a flush buffer action and a stop action. The "parmList" parameter identifies key value pairs including a string defining a pattern, an initial time-out threshold, a time-out threshold during detection, a maximum duration for receiving signals, an indicator of which signal reporting events are enable, an indicator of whether the oldest signal in the buffer should be discarded when the buffer is full, and an indicator of whether internal buffering is enabled. The method triggers an event containing the standard event keys plus event-specific keys identifying the reason the event was generated, e.g., by runtime control, by a stop command, by a timeout on the completion of matching patterns, by a timeout on the initial detection, by a timeout during detection of successive signals, because the requested number of signals was received, or by indicating which pattern was matched.

retrieveSignalsAsync, described in IDL as:

oneway void retrieveSignalsAsync (in unsigned long numSignals,
in unsigned long patterns,
in KVSeq rtc,
CTuint tranID);

This method is the asynchronous version of the retrieveSignals method. The method triggers an event containing the standard event keys plus event-specific keys identifying the reason the event was generated and containing error codes.

Consistent with the present invention, media services interface 220 of media server 200 includes IDL APIs for text-to-speech resources that are not part of a group. The TextToSpeech interface, which converts text into an audio file, and TextToSpeechFactory interface, which creates new TextToSpeech objects and acquires a handle to the text-to-speech server, include methods that are based on similar methods specified in the ECTF S.100 API, but are defined using IDL, thereby allowing for a platform-independent and language-independent implementation.

The TextToSpeech interface includes the method convertToSpeech, described in IDL as:

void convertToSpeech (in string text,
in string container,
in KVSeq parmList)
raises (CTException);

The convertToSpeech method converts the text specified in the parameter "text" to audio data stored in the file specified by the parameter "container." The "parmList" parameter identifies a key value set of parameters for specifying the pitch of the announcement, the speed of the announcement, the voice to use, the volume of the generated audio file, the type of pulse code modulation to use, and the language.

The TextToSpeechFactory interface includes the method__ new, described in IDL as:

static TextToSpeech__ptr__new (const char* containerRoot,

TextToSpeechFactory::Type ttstype);
The method_new creates a new TextToSpeech object. The parameter "containerRoot" indicates the directory where audio files specified with a relative path will be stored. The "ttstype" parameter specifies the type of TextToSpeech object to create, depending on the text-to-speech conversion package used, e.g., Centigram or Eloquent. The method returns TextToSpeech_ptr, a pointer to the new TextToSpeech object.

Consistent with the present invention, telephony services interface 210 of media server 200 includes IDL APIs that enable application 140 to access telephony resources available in network 105. In particular, the SystemCallRouter interface provides call control tasks for application 140, such as answering inbound calls, making outbound calls, configuring dynamic resources for a group, configuring a line device for outbound calls, providing an interface for group handoff using application service IDs, and transferring calls out of the media server. The SystemCallRouter interface includes methods that are based on similar methods specified in the ECTF S.100 API, but are defined using IDL, thereby allowing for a platform-independent and language-independent implementation. Similar to the IDL methods described above, the functions actually have two methods, one called in synchronous mode and one called in asynchronous mode. The methods called in synchronous mode return the completion event in the output parameter "tranInfo" and return errors in CTException. The methods called in asynchronous mode return errors in an event key. All parameters have the same meaning as those described in ECTF S.100, except as otherwise noted.

The methods of the SystemCallRouter interface are accessed through the OMSServer interface, which inherits from the SystemCallRouter interface. The SystemCallRouter interface includes the following methods:
answerCall, described in IDL as:
    void answerCall (in Group, group,
        in CTint timeout,
        in KVSeq parmList,
        out KVSeq tranInfo)
        raises (CTException);
The answerCall method answers an incoming call. The "group" parameter identifies the group that contains the call. The method triggers an event containing the standard event keys.
answerCallAsync, described in IDL as:
    oneway void answerCallAsync (in Group, group,
        in CTint timeout,
        in KVSeq parmList,
        in CTuint tranId);
This method is the asynchronous version of the answerCall method. The method triggers an event containing the standard event keys.
dropCall, described in IDL as:
    void dropCall (in Group, group,
        in CTint timeout,
        in KVSeq parmList,
        out KVSeq tranInfo)
        raises (CTException);
The dropCall method drops an incoming call but retains ownership of the group. The "group" parameter identifies the group encapsulating an active call. The "timeout" parameter specifies a time to wait for the call to drop. The method triggers an event containing the standard event keys.
dropCallAsync, described in IDL as:
    oneway void dropCallAsync (in Group, group,
        in CTint timeout,
        in KVSeq parmList,
        in CTuint tranId);
This method is the asynchronous version of the dropCall method. The method triggers an event containing the standard event keys.
makeCall, described in IDL as:
    Group makeCall (in Session session,
        in string destAddress,
        in string ASI,
        in string config,
        in CTint timeout,
        in KVSeq parmList,
        out KVSeq tranInfo)
        raises (CTException);
The makeCall method places an outbound call, which is handed to a session. The "ASI" parameter identifies the application service ID (ASI) of the session to take control of the call. If no value is specified for the "ASI" parameter, the "session" parameter identifies the session to take control of the call. The "destAddress" parameter is the dialable address for the outbound call. The "timeout" parameter specifies a time to wait for the call to complete. The method triggers an event containing the standard event keys plus event-specific keys for identifying the group containing the call, identifying the destination address dialed, and identifying the originating address used.
makeCallAsync, described in IDL as:
    Group makeCallAsync (in Session session,
        in string destAddress,
        in string ASI,
        in string config,
        in CTint timeout,
        in KVSeq parmList,
        in CTuint tranId);
This method is the asynchronous version of the makeCall method. The method triggers an event containing the standard event keys plus event-specific keys for identifying the group containing the call, identifying the destination address dialed, identifying the originating address used, and providing call analysis for a completed call, e.g., a connection was established, a voice was detected, or an answering machine was detected.
requestGroup, described in IDL as:
    void requestGroup (in Session session,
        in string ASI,
        in ACT act,
        in KVSeq parmList,
        out KVSeq tranInfo);
The requestGroup method registers the session as a target for groups handed off to an application service ID (ASI) using the handoff( ) method in the Group interface. The "parmList" parameter identifies key value pairs including the number of groups requested, a port number on which to request groups, the originating phone number on which to request groups, and the state of the call (e.g., when call is answered or when call is ringing) when the system call router hands the group to a session. The method triggers an event containing the standard event keys.
requestGroupAsync, described in IDL as:
    void requestGroupAsync (in Session session,
        in string ASI,
        in ACT act,
        in KVSeq parmList,
        in CTuint tranId);
This method is the asynchronous version of the requestGroup method. The method triggers an event containing the standard event keys.

It will be appreciated by those skilled in this art that various modifications and variations can be made to the language-independent, object-oriented interface for providing media and telephony services described herein without departing from the spirit and scope of the invention. Other embodiments of the invention will be apparent to those skilled in this art from consideration of the specification and practice of the invention disclosed herein. It is intended that the specification and examples be considered exemplary only, with a true scope and spirit of the invention being indicated by the following claims.

We claim:

1. A method for providing access from a client to multiple resources, coupled to a server, comprising:

transmitting from the client to the server an object-oriented, language-independent request to establish a session between the client and the server;

transmitting from the client to the server object-oriented, language-independent requests to establish multiple groups containing the resources, the groups corresponding to the session; and transmitting from the client to the server, an object-oriented, language-independent request to invoke at least a function on the resources.

2. The method of claim 1 wherein transmitting a request to establish a session includes setting a parameter corresponding to the session for determining event callback behavior.

3. The method of claim 1 wherein transmitting a request to establish a session includes setting a parameter corresponding to the session for determining whether an event will be created.

4. The method of claim 1 wherein transmitting a request to establish a session includes setting a parameter corresponding to the session for determining whether an event will be placed on an event queue.

5. The method of claim 1 wherein transmitting a request to establish a session includes setting a parameter corresponding to the session indicating whether an event key should be reported to the client.

6. The method of claim 1, wherein a second resource is coupled to the server, the method further comprising transmitting from the client to the server an object-oriented, language-independent request to establish a second group containing the second resource, the second group corresponding to the session; and transmitting from the client to the server an object-oriented, language-independent request to establish a connection between the first group and the second group.

7. The method of claim 1 wherein the resource is an announcement player and wherein transmitting an object-oriented, language-independent request to invoke a function on the resource includes transmitting a request to invoke a play function on the announcement player.

8. The method of claim 1 wherein the resource is a speech recognition device and wherein transmitting an object-oriented, language-independent request to invoke a function on the resource includes transmitting a request to invoke a start function on the speech recognition device.

9. The method of claim 1 wherein the resource is a speech recognition device and wherein transmitting an object-oriented, language-independent request to invoke a function on the resource includes transmitting a request to invoke a retrieve function on the speech recognition device.

10. The method of claim 1 wherein the resource is a signal generator and wherein transmitting an object-oriented, language-independent request to invoke a function on the resource includes transmitting a request to invoke a send function on the signal generator.

11. The method of claim 1 wherein the resource is a signal detector and wherein transmitting an object-oriented, language-independent request to invoke a function on the resource includes transmitting a request to invoke a retrieve function on the signal detector.

12. The method of claim 1 wherein the resource is a text-to-speech converter and wherein transmitting an object-oriented, language-independent request to invoke a function on the resource includes transmitting a request to invoke a convert function on the text-to-speech converter.

13. The method of claim 1 wherein the resource is a system call router and wherein transmitting an object-oriented, language-independent request to invoke a function on the resource includes transmitting a request to invoke an answer function on the system call router.

14. The method of claim 1 wherein the resource is a system call router and wherein transmitting an object-oriented, language-independent request to invoke a function on the resource includes transmitting a request to invoke a function on the system call router to make a call.

15. The method of claim 1 wherein the resource is a system call router and wherein transmitting an object-oriented, language-independent request to invoke a function on the resource includes transmitting a request to invoke a function on the system call router to drop a call.

16. A client comprising:

means for transmitting to a server an object-oriented, language-independent request to establish a session between the client and the server;

means for transmitting to the server object-oriented, language-independent requests to establish multiple groups containing resources, coupled to the server, each group corresponding to the session; and means for transmitting to the server object-oriented, language-independent requests to invoke at least a function on the resources.

17. The client of claim 16 wherein the means for transmitting a request to establish a session includes means for setting a parameter corresponding to the session for determining event callback behavior.

18. The client of claim 16 wherein the means for transmitting a request to establish a session includes means for setting a parameter corresponding to the session for determining whether an event will be created.

19. The client of claim 16 wherein the means for transmitting a request to establish a session includes means for setting a parameter corresponding to the session for determining whether an event will be placed on an event queue.

20. The client of claim 16 wherein means for transmitting a request to establish a session includes means for setting a parameter corresponding to the session indicating whether an event key should be reported to the client.

21. The client of claim 16 further comprising means for transmitting to the server an object-oriented, language-independent request to establish a second group containing a second resource, coupled to the server, the second group corresponding to the session; and means for transmitting to the server an object-oriented, language-independent request to establish a connection between the first group and the second group.

22. The client of claim 16 wherein the resource is an announcement player and wherein the means for transmitting an object-oriented, language-independent request to invoke a function on the resource includes means for transmitting a request to invoke a play function on the announcement player.

23. The client of claim 16 wherein the resource is a speech recognition device and wherein the means for transmitting an object-oriented, language-independent request to invoke a function on the resource includes means for transmitting a request to invoke a start function on the speech recognition device.

24. The client of claim 16 wherein the resource is a speech recognition device and wherein the means for transmitting an object-oriented, language-independent request to invoke a function on the resource includes means for transmitting a request to invoke a retrieve function on the speech recognition device.

25. The client of claim 16 wherein the resource is a signal generator and wherein the means for transmitting an object-oriented, language-independent request to invoke a function on the resource includes means for transmitting a request to invoke a send function on the signal generator.

26. The client of claim 16 wherein the resource is a signal detector and wherein the means for transmitting an object-oriented, language-independent request to invoke a function on the resource includes means for transmitting a request to invoke a retrieve function on the signal detector.

27. The client of claim 16 wherein the resource is a text-to-speech converter and wherein the means for transmitting an object-oriented, language-independent request to invoke a function on the resource includes means for transmitting a request to invoke a convert function on the text-to-speech converter.

28. The client of claim 16 wherein the resource is a system call router and wherein the means for transmitting an object-oriented, language-independent request to invoke a function on the resource includes means for transmitting a request to invoke an answer function on the system call router.

29. The client of claim 16 wherein the resource is a system call router and wherein the means for transmitting an object-oriented, language-independent request to invoke a function on the resource includes means for transmitting a request to invoke a function on the system call router to make a call.

30. The client of claim 16 wherein the resource is a system call router and wherein the means for transmitting an object-oriented, language-independent request to invoke a function on the resource includes means for transmitting a request to invoke a function on the system call router to drop a call.

\* \* \* \* \*